US010064073B2

(12) United States Patent
Chakrabarti et al.

(10) Patent No.: US 10,064,073 B2
(45) Date of Patent: Aug. 28, 2018

(54) OPTIMIZING BANDWIDTH OF COGNITIVE RADIOS

(71) Applicant: International Business Machines Corporation, Armonk, NY (US)

(72) Inventors: Souradeep Chakrabarti, Kolkata (IN); Arun Kumar Sreenivas Prasad, Trivandrum (IN)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 15/349,088

(22) Filed: Nov. 11, 2016

(65) Prior Publication Data

US 2018/0139629 A1     May 17, 2018

(51) Int. Cl.
| | |
|---|---|
| *H04L 12/26* | (2006.01) |
| *H04W 24/02* | (2009.01) |
| *H04L 29/06* | (2006.01) |
| *H04W 16/14* | (2009.01) |
| *H04W 28/20* | (2009.01) |
| *H04L 12/24* | (2006.01) |

(52) U.S. Cl.
CPC ......... *H04W 24/02* (2013.01); *H04L 41/0896* (2013.01); *H04L 69/16* (2013.01); *H04W 16/14* (2013.01); *H04W 28/20* (2013.01)

(58) Field of Classification Search
None
See application file for complete search history.

(56) References Cited

U.S. PATENT DOCUMENTS

| | | | | |
|---|---|---|---|---|
| 2007/0206554 | A1* | 9/2007 | Laroia | H04L 5/0035 370/338 |
| 2013/0157580 | A1* | 6/2013 | Qiu | H04B 17/00 455/67.11 |
| 2013/0343187 | A1 | 12/2013 | Wang et al. | |

FOREIGN PATENT DOCUMENTS

WO      2015084149 A1      6/2015

OTHER PUBLICATIONS

Brakmo et al., "TCP Vegas: End to End Congestion Avoidance on a Global Internet," IEEE Journal on Selected Areas in Communications, vol. 13, No. 8, Oct. 1995, 16 pages.
(Continued)

*Primary Examiner* — Minh-Trang Nguyen
(74) *Attorney, Agent, or Firm* — Jared C. Chaney

(57) ABSTRACT

The present invention provides a computer implemented method, system, and computer program product of optimizing bandwidth of cognitive radios (CRs). In an embodiment, the present invention includes monitoring use of channels of digital wireless spectrum by at least one primary user communications device (PU device), resulting in PU activity data describing the use, using a digital wireless spectrum channel with a lowest usage by the at least one PU device as indicated by the PU activity data, detecting when the at least one PU device begins to use at least one digital wireless spectrum channel, calculating TCP connection data describing a plurality of TCP connections in light of TCP connection parameter data, and performing a network congestion-avoidance algorithm using the calculated TCP connection data, resulting in digital wireless transmission characteristics for at least one of the plurality of TCP connections that are optimized for at least one CR device.

20 Claims, 9 Drawing Sheets

(56) References Cited

OTHER PUBLICATIONS

Chandran et al., "A Feedback Based Scheme for Improving TCP Performance in Ad-Hoc Wireless Networks," Computer Science Program at the University of Texas at Dallas, printed on Sep. 22, 2016, 17 pages.

Chowdhury et al., "TP-CRAHN: A Transport Protocol for Cognitive Radio Ad-hoc Networks," This full text paper was peer reviewed at the direction of IEEE Communications Society subject matter experts for publication in the IEEE INFOCOM 2009 proceedings, Copyright 2009 IEEE, pp. 2482-2490.

Di Felice et al., "Modeling and Performance Evaluation of Transmission Control Protocol over Cognitive Radio Ad Hoc Networks," MSWiiM'09, Oct. 26-29, 2009, Tenerife, Canary Islands, Spain, Copyright 2009 ACM, pp. 4-12.

Henderson et al., "The NewReno Modification to TCP's Fast Recovery Algorithm," Internet Engineering Task Force (IETF), Abstract Wide Project, Apr. 2012, 16 pages.

Mascolo et al., "TCP Westwood: congestion control with faster recovery," UCLA CSD TR #200017, printed on Sep. 22, 2016, Computer Science Department—UCLA, Los Angeles, CA, 14 pages.

Mathis et al., "TCP Selective Acknowledgment Options," Network Working Group, Abstract Sun Microsystems, Oct. 1996, 12 pages.

Monks et al., "Limitations of TCP-ELFN for Ad hoc Networks," Coordinated Science Laboratory, University of Illinois at Urbana-Champaign, Urbana, IL, printed on Sep. 22, 2016, 6 pages.

Slingerland et al., "Performance of Transport Control Protocol over Dynamic Spectrum Access Links," Faculty of Electrical Engineering, Mathematics and Computer Science, Delft University of Technology, Mekelweg 4, 2600 GA Delft, The Netherlands, printed on Sep. 22, 2016, 10 pages.

Unknown, "Proposed Network Machine Learning Research Group," last updated Aug. 19, 2015, printed Nov. 9, 2016, 2 pages, https://datatracker.ietf.org/doc/charter-irtf-nmlrg/1.

Ghobadi, "TCP Adaptation Framework in Data Centers," Thesis, University of Toronto, 2013, 146 pages.

Ghobadi et al., "TCP Parameter Dynamic Control," Internet Draft, Oct. 27, 2014, 15 pages, https://tools.ietf.org/html/draft-song-dclc-tcpdc-04.

Dunigan et al., "A TCP Tuning Daemon," Abstract, Jul. 29, 2002, 16 pages, Copyright 2002 IEEE.

Zhou et al., "Investigation of TCP Protocols in Dynamically Varying Bandwidth Conditions," Institute for Computer Sciences, Social Informatics and Telecommunications Engineering 2015, pp. 176-186, 2015, DOI: 10.1007/978-3-319-24540-9_14.

\* cited by examiner

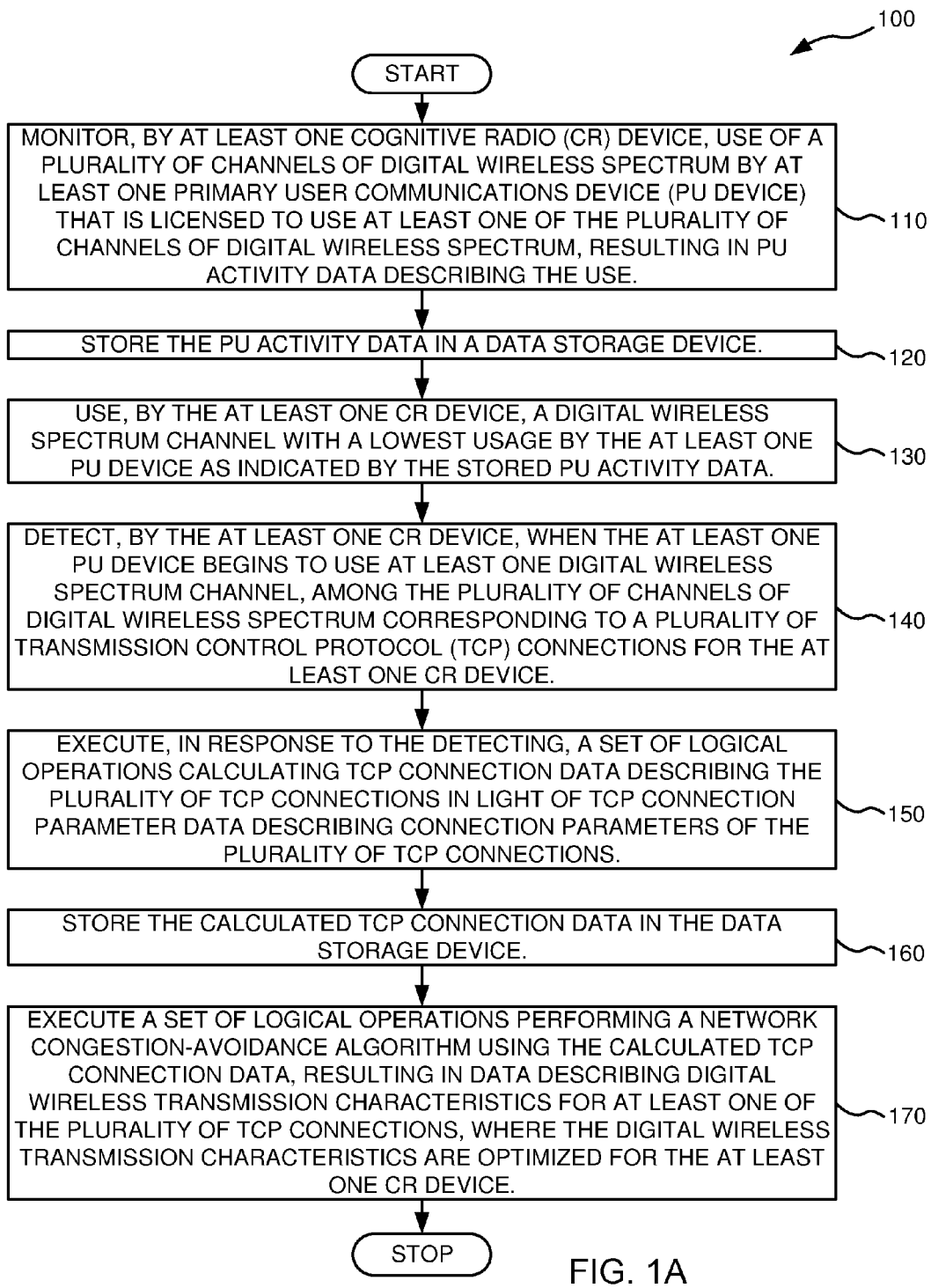

OPTIMIZING BANDWIDTH OF COGNITIVE RADIOS

BACKGROUND

The present disclosure relates to cognitive radios, and more specifically, to optimizing bandwidth of cognitive radios.

SUMMARY

The present invention provides a computer implemented method, a system, and a computer program product of optimizing bandwidth of cognitive radios. In an exemplary embodiment, the computer implemented method, the system, and the computer program product include (1) monitoring, by at least one cognitive radio (CR) device, use of a plurality of channels of digital wireless spectrum by at least one primary user communications device (PU device) that is licensed to use at least one of the plurality of channels of digital wireless spectrum, resulting in PU activity data describing the use, (2) storing, by a computer system, the PU activity data in a data storage device, (3) using, by the at least one CR device, a digital wireless spectrum channel, among the plurality of channels of digital wireless spectrum, with a lowest usage by the at least one PU device as indicated by the stored PU activity data, (4) detecting, by the at least one CR device, when the at least one PU device begins to use at least one digital wireless spectrum channel, among the plurality of channels of digital wireless spectrum corresponding to a plurality of transmission control protocol (TCP) connections for the at least one CR device, (5) executing, by the computer system, in response to the detecting, a set of logical operations calculating TCP connection data describing the plurality of TCP connections in light of TCP connection parameter data describing connection parameters of the plurality of TCP connections, (6) storing, by the computer system, the calculated TCP connection data in the data storage device, and (7) executing, by the computer system, a set of logical operations performing a network congestion-avoidance algorithm using the calculated TCP connection data, resulting in data describing digital wireless transmission characteristics for at least one of the plurality of TCP connections, where the digital wireless transmission characteristics are optimized for the at least one CR device. In a further embodiment, the computer implemented method, the system, and the computer program product further include using, by the at least one CR device, the at least one of the plurality of TCP connections, where the digital wireless transmission characteristics are optimized for the at least one CR device. In an embodiment, the computer system includes the at least one CR device. In an embodiment, the data storage device includes at least one local data storage device of the at least one CR device.

BRIEF DESCRIPTION OF THE DRAWINGS

FIG. 1A depicts a flowchart in accordance with an exemplary embodiment of the present invention.

DETAILED DESCRIPTION

Figure 1B:
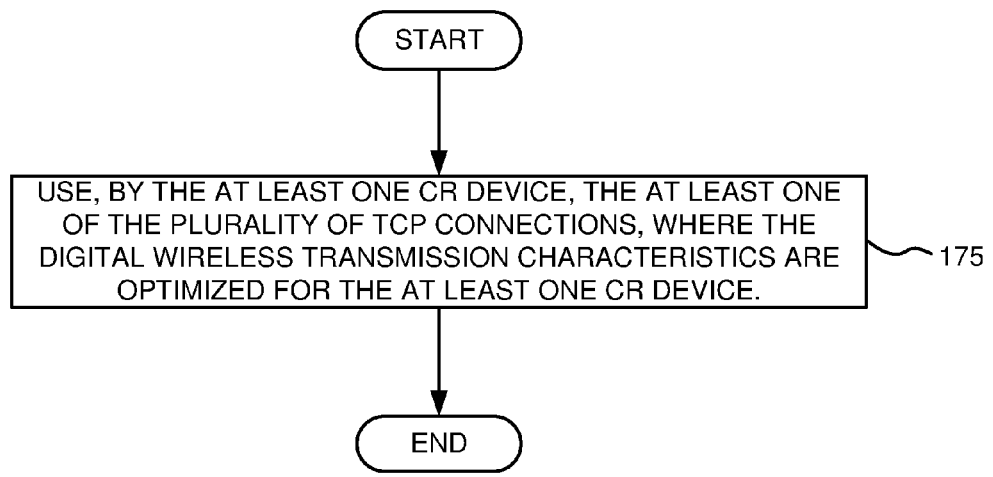
FIG. 1B depicts a flowchart in accordance with an exemplary embodiment of the present invention.

The present invention provides a computer implemented method, a system, and a computer program product of optimizing bandwidth of cognitive radios. In an exemplary embodiment, the computer implemented method, the system, and the computer program product include (1) monitoring, by at least one cognitive radio (CR) device, use of a plurality of channels of digital wireless spectrum by at least one primary user communications device (PU device) that is licensed to use at least one of the plurality of channels of digital wireless spectrum, resulting in PU activity data describing the use, (2) storing, by a computer system, the PU activity data in a data storage device, (3) using, by the at least one CR device, a digital wireless spectrum channel, among the plurality of channels of digital wireless spectrum, with a lowest usage by the at least one PU device as indicated by the stored PU activity data, (4) detecting, by the at least one CR device, when the at least one PU device begins to use at least one digital wireless spectrum channel, among the plurality of channels of digital wireless spectrum corresponding to a plurality of transmission control protocol (TCP) connections for the at least one CR device, (5) executing, by the computer system, in response to the detecting, a set of logical operations calculating TCP connection data describing the plurality of TCP connections in light of TCP connection parameter data describing connection parameters of the plurality of TCP connections, (6) storing, by the computer system, the calculated TCP connection data in the data storage device, and (7) executing, by the computer system, a set of logical operations performing a network congestion-avoidance algorithm using the calculated TCP connection data, resulting in data describing digital wireless transmission characteristics for at least one of the plurality of TCP connections, where the digital wireless transmission characteristics are optimized for the at least one CR device. In a further embodiment, the computer implemented method, the system, and the computer program product further include using, by the at least one CR device, the at least one of the plurality of TCP connections, where the digital wireless transmission characteristics are optimized for the at least one CR device. In an embodiment, the computer system includes the at least one CR device. In an embodiment, the data storage device includes at least one local data storage device of the at least one CR device.

Definitions

Cognitive Radio (CR) Device

A cognitive radio (CR)/CR device is an intelligent radio that can be programmed and configured dynamically. The transceiver of a CR device is designed to use the best wireless channels in its vicinity. A CR device automatically detects available channels in wireless spectrum, then accordingly changes its transmission or reception parameters to allow more concurrent wireless communications in a given spectrum band at one location, in a form of dynamic spectrum management. In response to commands of an operator, a CR device is capable of configuring radio-system parameters, including waveform, protocol, operating frequency, and networking. The CR device functions as an autonomous unit in a communications environment, exchanging information about the environment with the networks that the CR device accesses and other cognitive radios (CRs). A CR device monitors its own performance continuously, in addition to reading outputs of the CR device, uses this information to determine the radio frequency (RF) environment, channel conditions, link performance, and then adjusts settings of the CR device to deliver a required quality of service subject to an appropriate combination of user requirements, operational limitations, and regulatory constraints. Two types of CR device are a full CR, in which every possible parameter observable by a wireless node (or network) is considered by the CR device and a spectrum-sensing CR, in which only the radio-frequency spectrum is considered by the CR device. A CR device enhances spectrum utilization by using a dynamic spectrum access (DSA) paradigm, where the CR device looks for non-occupied frequency bands (both licensed and unlicensed), adapts itself for these new spectral opportunities, and attempts to communicate on the chosen frequencies.

A multi-standard cognitive radio (MSCR) is a CR device that is able to operate in multiple frequency bands with different specified standards. A MSCR is a generalization of a CR device that can operate across different bands and standards and that can adapt its hardware structure to support standards like GSM, UMTS, and wireless LAN. A MSCR has a flexible radio controller can insert and remove compiled modules to adapt to current conditions.

A CR device can perform several functions. For example, a CR device can perform power control (e.g., for spectrum sharing CR devices) to maximize the capacity of secondary users with interference power constraints to protect primary users. Also, a CR device can perform spectrum sensing where the CR device detects unused spectrum and shares the unused spectrum, without harmful interference to other users, for example, by detecting primary users. In other words, the CR device can determine if a signal from a primary transmitter (of a primary user communications device) is locally present in a certain spectrum, via matched filter detection, energy detection, and/or cyclostationary-feature detection.

A CR device can detect the presence of a PU device in a certain spectrum by using matched filter detection by using a matched filter on the certain spectrum. A matched filter is obtained by correlating a known signal, or template, with an unknown signal to detect the presence of the template in the unknown signal. This is equivalent to convolving the unknown signal with a conjugated time-reversed version of the template. The matched filter is the optimal linear filter for maximizing the signal to noise ratio (SNR) in the presence of additive stochastic noise. Pulse compression is an example of matched filtering where an impulse response is matched to input pulse signals. Matched filtering is a demodulation technique with LTI (linear time invariant) filters to maximize SNR.

A CR device can detect the presence of a PU device in a certain spectrum by using energy detection on the certain spectrum. Energy detection is a spectrum sensing method that detects the presence/absence of a signal by measuring the received signal power. In order to implement energy detection, noise variance information is required such that an imperfect knowledge of the noise power (noise uncertainty) may lead to the phenomenon of a SNR wall, which is a SNR level below which an energy detector implementing energy detection cannot reliably detect any transmitted signal even when increasing an observation time, where the SNR wall is not caused by the presence of a noise uncertainty itself, but by an insufficient refinement of the noise power estimation while the observation time increases.

A CR device can detect the presence of a PU device in a certain spectrum by using cyclostationary-feature detection on the certain spectrum. A cyclostationary signal has statistical properties that vary cyclically with time. Most man-made communication signals, such as binary phase-shift keying (BPSK), quadrature phase-shift keying (QPSK), amplitude modulation (AM), orthogonal frequency-division multiplexing (OFDM), exhibit cyclostationary behavior, while noise signals (typically white noise) do not exhibit cyclostationary behavior. Cyclostationary-feature detection detectors are robust against noise variance uncertainty. Cyclostationary-feature detection exploits the cyclostationary nature of man-made communication signals buried in noise. Cyclostationary detectors can be either single cycle or multicycle cyclostationary.

A CR device can also perform other functions. For example, a CR device can perform wideband spectrum sensing, where the CR device performs spectrum sensing over large spectral bandwidth, typically hundreds of MHz or even several GHz, requiring revolutional techniques (e.g., compressive sensing and sub-Nyquist sampling). A CR device can also perform cooperative detection, spectrum-sensing where information from multiple cognitive-radio users is incorporated for primary-user detection. A CR device can, with the aid of multiple antennas, detect the null-space of a PU device and then transmit within the null-space, such that a subsequent transmission of the CR device would cause less interference to the PU device. A CR device can spectrum management, thereby capturing the best available spectrum to meet communication requirements of a user of the CR device, while not creating undue interference to other users (e.g., PU devices), performing spectrum analysis and spectrum decision.

Transmission Control Protocol (TCP)

Transmission Control Protocol (TCP) is one of the main protocols of the Internet protocol suite. TCP originated in the initial network implementation in which it complemented the Internet Protocol (IP). Therefore, the entire suite is commonly referred to as TCP/IP. TCP provides reliable, ordered, and error-checked delivery of a stream of octets between applications running on hosts communicating by an IP network. TCP provides a communication service at an intermediate level between an application program and the Internet Protocol. TCP provides host-to-host connectivity at the Transport Layer of the Internet model, such that an application does not need to know the particular mechanisms for sending data via a link to another host, such as the required packet fragmentation on the transmission medium. At the transport layer, TCP protocol handles all handshaking and transmission details and presents an abstraction of the network connection to the application. TCP detects problems at the lower levels of the protocol stack (e.g., due to network congestion, traffic load balancing, or other unpredictable network behavior, IP packets may be lost, duplicated, or delivered out of order), requests re-transmission of lost data, rearranges out-of-order data, and helps to minimize network congestion to reduce the occurrence of other problems. If the data still remains undelivered, its source is notified of this failure. Once a TCP receiver has reassembled the sequence of octets originally transmitted, the TCP receiver passes the reassembled sequence of octets to a receiving application. Thus, TCP abstracts the communication of an application from underlying networking details.

TCP is optimized for accurate delivery rather than timely delivery. Therefore, TCP sometimes incurs relatively long delays (on the order of seconds) while waiting for out-of-order messages or re-transmissions of lost messages. TCP is not particularly suitable for real-time applications such as Voice over IP. For such applications, protocols like the Real-time Transport Protocol (RTP) operating over the User Datagram Protocol (UDP) are usually recommended instead. TCP is a reliable stream delivery service which guarantees that all bytes received will be identical with bytes sent and in the correct order. Since packet transfer by many networks is not reliable, a technique known as positive acknowledgement with re-transmission is used in TCP to guarantee reliability of packet transfers, requiring the receiver to respond with an acknowledgement message as it receives the data. The sender keeps a record of each packet that the sender sends and maintains a timer from when the packet was sent. The sender re-transmits a packet if the timer expires before the message has been acknowledged, where the timer is needed in case a packet gets lost or corrupted. While IP handles actual delivery of the data, TCP keeps track of segments of data (the individual units of data transmission into which a message is divided) for efficient routing through a communications network. For example, when an HTML file is sent from a web server, the TCP software layer of that server divides the sequence of file octets into segments and forwards them individually to the IP software layer (Internet Layer), which then encapsulates each TCP segment into an IP packet by adding a header that includes (among other data) the destination IP address, such that when a client program on the destination computer receives them, the TCP layer (Transport Layer) re-assembles the individual segments and ensures that they are correctly ordered and error-free as it streams them to an application.

Network Congestion Avoidance Control

TCP also performs congestion control using a number of mechanisms to achieve high performance and to avoid congestion collapse, where network performance can fall by several orders of magnitude. Network congestion is the reduced quality of service that occurs when a network node is carrying more data than it can handle, resulting in queueing delay, packet loss, or the blocking of new connections, such that an incremental increase in offered load leads either only to a small increase or even a decrease in network throughput. Networks use congestion control and congestion avoidance techniques to try to avoid collapse. Congestive collapse (or congestion collapse) is the condition in which congestion prevents or limits useful communication. Congestion collapse generally occurs at choke points in the network, where incoming traffic exceeds outgoing bandwidth, with connection points between a local area network and a wide area network being common choke points. When a network is in this condition, it settles into a stable state where traffic demand is high but little useful throughput is available, packet delay and loss and quality of service is extremely poor. Congestion control modulates traffic entry into a telecommunications network in order to avoid congestive collapse resulting from oversubscription, typically accomplished by reducing the rate of packets.

TCP congestion control mechanisms control the rate of data entering a network, thereby keeping the data flow below a rate that would trigger collapse and yield an approximately maximum-minimum fair allocation between flows. Acknowledgments for data sent, or lack of acknowledgments, are used by senders to infer network conditions between the TCP sender and receiver such that, coupled with timers, TCP senders and receivers can alter the behavior of the flow of data. TCP contains four intertwined congestion control algorithms named slow-start, congestion avoidance, fast retransmit, and fast recovery (RFC 5681). TCP uses a network congestion-avoidance algorithm that includes various aspects of an additive increase/multiplicative decrease (AIMD) scheme, with other schemes such as slow-start and congestion window to achieve congestion avoidance. The TCP congestion-avoidance algorithm is the primary basis for congestion control in the Internet. There are several variations and versions of the TCP congestion-avoidance algorithm implemented and in use on the internet. In order to avoid congestive collapse in a digital communications network, TCP uses a multi-faceted congestion-control strategy such that for each connection, TCP maintains a congestion window, limiting the total number of unacknowledged packets that may be in transit end-to-end (somewhat analogous to a sliding window of TCP used for flow control.)

TCP uses a mechanism called slow start to increase the congestion window after a connection is initialized or after a timeout. The slow start mechanism starts with a congestion window of two times the maximum segment size (MSS) but increases the congestion window rapidly, such that for every packet acknowledged, the congestion window increases by one MSS so that the congestion window effectively doubles for every round-trip time (RTT). RTT is the length of time it takes for a signal to be sent plus the length of time it takes for an acknowledgment of that signal to be received and consists of the propagation times between the two points of a signal, where the signal is generally a data packet, and the RTT is also known as the ping time. When the congestion window exceeds a ssthresh threshold, the algorithm enters a new state, called congestion avoidance. In some implementations (e.g., Linux), the initial ssthresh is large, and so the first slow start usually ends after a loss. However, ssthresh is updated at the end of each slow start, and will often affect subsequent slow starts triggered by timeouts.

TCP also uses a mechanism called congestion avoidance. While in the congestion avoidance state, as long as non-duplicate ACKs are received, the congestion window is additively increased by one MSS every RTT. When a packet is lost, the likelihood of duplicate ACKs being received is very high.

Congestion Window

In TCP, congestion window is one of the factors that determines the number of bytes that can be outstanding at any time. The congestion window is maintained by the sender (not to be confused with the TCP window size which is maintained by the receiver). The congestion window is a means of stopping a link between the sender and the receiver from becoming overloaded with too much traffic. The congestion window is calculated by estimating how much congestion there is on the link. When a connection is set up, the congestion window, a value maintained independently at each host, is set to a small multiple of the MSS allowed on that connection. Further variance in the congestion window is dictated by an AIMD approach, such that if all segments are received and the acknowledgments reach the sender on time, some constant is added to the window size. The congestion window keeps growing exponentially until a timeout occurs or the receiver reaches its limit, a threshold value ssthresh. If the sender reaches this threshold, the congestion window increases linearly at the rate of 1/(congestion window) segment on each new acknowledgement received. On timeout, the congestion window is reset to 1 MSS, ssthresh is set to half the congestion window size before segment loss started, and slow start is initiated. A system administrator may adjust the maximum window size limit, or adjust the constant added during additive increase, as part of TCP tuning. The flow of data over a TCP connection is also controlled by the use of the receiver advertised TCP Receive Window. By comparing its own congestion window with the receive window of the receiver, a sender can determine how much data it may send at any given time.

Slow Start

Slow start is used in conjunction with other algorithms to avoid sending more data than the network is capable of transmitting, that is, to avoid causing network congestion. Slow start begins initially with a congestion window size (cwnd) of 1, 2 or 10. The value of the congestion window will be increased by one with each acknowledgement (ACK) received, effectively doubling the window size each round-trip time, although it is not exactly exponential because the receiver may delay its ACKs, typically sending one ACK for every two segments that it receives. The transmission rate will be increased with slows start until either a loss is detected, the receiver's advertised window (rwnd) is reached, or the slow start threshold (ssthresh) is reached. If a loss event occurs, TCP assumes that it is due to network congestion and takes steps to reduce the offered load on the network. These measurements depend on the TCP congestion avoidance algorithm used on the network. Once ssthresh is reached, TCP changes from slow-start algorithm to the linear growth (congestion avoidance) algorithm, such that the congestion window is increased by one segment for each RTT.

The behavior upon packet loss depends on the TCP congestion avoidance algorithm that is used. With a TCP congestion avoidance algorithm called TCP Tahoe, when a loss occurs, fast retransmit is sent, half of the current cwnd is saved as a slow start threshold (ssthresh) and slow start begins again from its initial cwnd. Once the cwnd reaches the ssthresh, TCP changes to congestion avoidance algorithm where each new ACK increases the cwnd by SS+SS/cwnd, resulting in a linear increase of the cwnd. A congestion avoidance algorithm called TCP Reno implements an algorithm called Fast recovery such that first a fast retransmit is sent and then half of the current cwnd is saved as ssthresh and as new cwnd, thus skipping slow start and going directly to a congestion avoidance algorithm.

Slow start assumes that unacknowledged segments are due to network congestion. While this is an acceptable assumption for many networks, segments may be lost for other reasons, such as poor data link layer transmission quality. Thus, slow start can perform poorly in situations with poor reception, such as wireless networks. Also, the slow start protocol performs badly for short-lived connections, such that older web browsers would create many consecutive short-lived connections to the web server, and would open and close the connection for each file requested, keeping most connections in the slow start mode, which resulted in poor response time. In order to avoid this problem, modern browsers either open multiple connections simultaneously or reuse one connection for all files requested from a particular web server.

A congestion avoidance algorithm called TCP New Reno improves retransmission during the fast-recovery phase of TCP Reno. During fast recovery, for every duplicate ACK that is returned to TCP New Reno, a new unsent packet from the end of the congestion window is sent, to keep the transmit window full. For every ACK that makes partial progress in the sequence space, the sender assumes that the ACK points to a new hole, and the next packet beyond the ACKed sequence number is sent. Because the timeout timer is reset whenever there is progress in the transmit buffer, TCP New Reno is able to fill large holes, or multiple holes, in the sequence space, much like TCP SACK. Because TCP New Reno can send new packets at the end of the congestion window during fast recovery, high throughput is maintained during the hole-filling process, even when there are multiple holes, of multiple packets each. When TCP enters fast recovery it records the highest outstanding unacknowledged packet sequence number. When this sequence number is acknowledged, TCP returns to the congestion avoidance state. A problem occurs with TCP New Reno when there are no packet losses but instead, packets are reordered by more than 3 packet sequence numbers, such that TCP New Reno mistakenly enters fast recovery, such that when the reordered packet is delivered, ACK sequence-number progress occurs and, from there until the end of fast recovery, every bit of sequence-number progress produces a duplicate and needless retransmission that is immediately ACKed. TCP New Reno performs as well as SACK at low packet error rates, and substantially outperforms Reno at high error rates.

TCP Westwood (TCPW) is a sender-side-only modification to TCP New Reno that is intended to better handle large bandwidth-delay product paths (large pipes), with potential packet loss due to transmission or other errors (leaky pipes), and with dynamic load (dynamic pipes). TCP Westwood relies on mining the ACK stream for information to help it better set the congestion control parameters slow start threshold (ssthresh) and congestion window (cwin). In TCP Westwood, an eligible rate is estimated and used by the sender to update ssthresh and cwin upon loss indication, or during an agile probing phase, a proposed modification to the slow start phase. In addition, in TCP Westwood, a scheme called persistent non congestion detection (PNCD) has been devised to detect persistent lack of congestion and induce an agile probing phase to expeditiously utilize large dynamic bandwidth. Performance gains with TCP Westwood in efficiency, without undue sacrifice of fairness, friendliness, and stability have been observed. Significant efficiency gains can be obtained for large leaky dynamic pipes, while maintaining fairness. Under a more appropriate criterion for friendliness (i.e., opportunistic friendliness), TCP Westwood is shown to have good, and controllable, friendliness. TCP Westwood uses end-to-end bandwidth estimation for setting control windows after congestion.

TCP Westwood plus (TCP Westwood+) is an evolution of TCP Westwood. TCP Westwood+ is a sender-side only modification of the TCP Reno protocol stack that optimizes the performance of TCP congestion control over both wireline and wireless networks. TCP Westwood+ is based on end-to-end bandwidth estimation to set congestion window and slow start threshold after a congestion episode (after three duplicate acknowledgments or a timeout). The bandwidth is estimated by properly low-pass filtering the rate of returning acknowledgment packets (in contrast with TCP Reno, which halves the congestion window after three duplicate ACKs) by adaptively setting a slow start threshold and a congestion window which takes into account the bandwidth used at the time congestion is experienced. TCP Westwood+ has been observed to significantly increase throughput over wireless links and fairness compared to TCP Reno/New Reno in wired networks. TCP Westwood+ uses an algorithm to estimate the available bandwidth end-to-end.

Fast Restransmit

Fast Retransmit is an enhancement to TCP which reduces the time a sender waits before retransmitting a lost segment. With Fast Retransmit, a TCP sender uses a timer to recognize lost segments such that if an acknowledgement is not received for a particular segment within a specified time (a function of the estimated round-trip delay time), the sender will assume the segment was lost in the network, and will retransmit the segment. Duplicate acknowledgement is the basis for the fast retransmit mechanism which works as follows: after receiving a packet (e.g., with sequence number 1), the receiver sends an acknowledgement by adding 1 to the sequence number (i.e., acknowledgement number 2) which means that the receiver received the packet number 1 and it expects packet number 2 from the sender; assuming that three subsequent packets have been lost, the receiver receives packet numbers 5 and 6 such that after receiving packet number 5, the receiver sends an acknowledgement, but still only for sequence number 2; when the receiver receives packet number 6, the receiver sends another acknowledgement value of 2. With fast retransmit, if a TCP sender receives a specified number of acknowledgements which is usually set to three duplicate acknowledgements with the same acknowledge number (that is, a total of four acknowledgements with the same acknowledgement number), the sender can be reasonably confident that the segment with the next higher sequence number was dropped, and will not arrive out of order, such that the sender will then retransmit the packet that was presumed dropped before waiting for its timeout.

Media Access Control (MAC)

The medium access control or media access control (MAC) layer is the lower sublayer of the data link layer (layer 2) of the seven-layer OSI model. The MAC sublayer provides addressing and channel access control mechanisms that make it possible for several terminals or network nodes to communicate within a multiple access network that incorporates a shared medium (e.g., an Ethernet network). The hardware that implements the MAC is referred to as a media access controller. The MAC sublayer acts as an interface between the logical link control (LLC) sublayer and the network's physical layer, where the MAC layer emulates a full-duplex logical communication channel in a multi-point network such that the channel may provide unicast, multicast or broadcast communication service. Channel access control mechanisms provided by the MAC layer are also known as a multiple access protocol which makes it possible for several stations connected to the same physical medium to share it, such as bus networks, ring networks, hub networks, wireless networks and half-duplex point-to-point links. The multiple access protocol of the MAC layer may detect or avoid data packet collisions if a packet mode contention based channel access method is used, or reserve resources to establish a logical channel if a circuit-switched or channelization-based channel access method is used. The channel access control mechanism of the MAC layer relies on a physical layer multiplex scheme.

Problems with TCP and Wireless Networks

TCP is one of the most dominant protocols in layer 4 of the network stack. However, the current TCP is inefficient when used over mobile networks and digital wireless communications networks. When TCP is used in a CR network, TCP adds some more problems because of variable channel characteristics, and spectrum sensing, such that throughput gets impacted in MSCRs. A CR device can use digital wireless spectrum channels with variable characteristics and constantly monitors a radio environment in order to find spectrum holes that can be used. Since each channel can have different characteristics in terms of bandwidth, loss and delay, TCP can be slow to adapt to frequent changes in the bandwidth and is sensitive to loss and delay, leading to efficiency deterioration. A CR device can also experience temporary disconnections due to spectrum sensing. A CR device alternates between a sensing mode and a transmission mode, such that during the sensing mode, the CR device does not transmit the data, leading to a sudden increase in RTT, leading to an underutilization of the available bandwidth. A CR device also can experience spectrum handover when a PU device appears on a digital wireless spectrum channel. Whenever a PU device appears in a digital wireless spectrum channel, secondary user devices (i.e., a CR device) has to vacate the channel and have to find another channel to use. In order for the CR device to transition from one channel to another channel, the delay and the disconnection period experienced by the CR device can degrade TCP performance and can also cause a TCP round trip timer to expire, thereby reducing TCP efficiency.

In traditional TCP/IP network, a packet loss event is attributed to a congested network and results in a connection entering the slow start phase. In a CR device network, packet loss can happen due to PU activity such that starting the slow start will degrade the performance of TCP in CR networks. Also, most of the existing wireless TCP solutions depends on time dependent information such as RTT or delay time. However, with a CR device, such time information may not be trustable for measuring current or predicting future network conditions because of bandwidth variation.

Referring to FIG. 1A, in an exemplary embodiment, the present invention is configured to perform an operation 110 of monitoring, by at least one cognitive radio (CR) device, use of a plurality of channels of digital wireless spectrum by at least one primary user communications device (PU device) that is licensed to use at least one of the plurality of channels of digital wireless spectrum, resulting in PU activity data describing the use, an operation 120 of storing, by a computer system, the PU activity data in a data storage device, an operation 130 of using, by the at least one CR device, a digital wireless spectrum channel, among the plurality of channels of digital wireless spectrum, with a lowest usage by the at least one PU device as indicated by the stored PU activity data, an operation 140 of detecting, by the at least one CR device, when the at least one PU device begins to use at least one digital wireless spectrum channel, among the plurality of channels of digital wireless spectrum corresponding to a plurality of transmission control protocol (TCP) connections for the at least one CR device, an operation 150 of executing, by the computer system, in response to the detecting, a set of logical operations calculating TCP connection data describing the plurality of TCP connections in light of TCP connection parameter data describing connection parameters of the plurality of TCP connections, an operation 160 of storing, by the computer system, the calculated TCP connection data in the data storage device, and an operation 170 of executing, by the computer system, a set of logical operations performing a network congestion-avoidance algorithm using the calculated TCP connection data, resulting in data describing digital wireless transmission characteristics for at least one of the plurality of TCP connections, where the digital wireless transmission characteristics are optimized for the at least one CR device. Referring to FIG. 1B, in a further embodiment, the present invention is further configured to perform an operation 175 of using, by the at least one CR device, the at least one of the plurality of TCP connections, where the digital wireless transmission characteristics are optimized for the at least one CR device. In an embodiment, the computer system includes the at least one CR device. In an embodiment, the data storage device includes at least one local data storage device of the at least one CR device.

Figure 5:
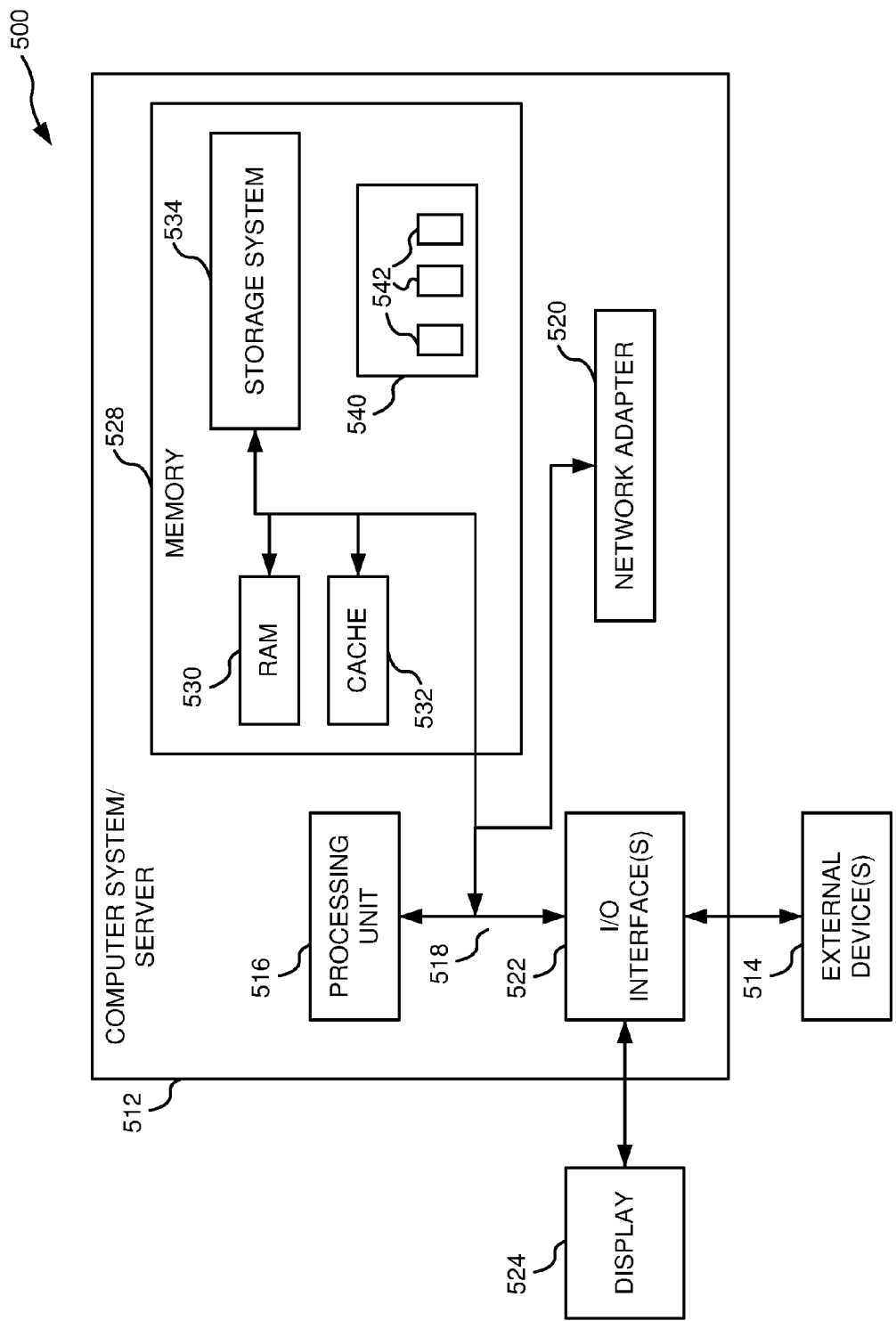
FIG. 5 depicts a computer system in accordance with an exemplary embodiment of the present invention.

In an embodiment, the computer system is a computer system 500 as shown in FIG. 5, that executes a bandwidth optimizing script or computer software application that carries out the operations of at least method 100. In an embodiment, the computer system is a computer system/server 5120 as shown in FIG. 5, that executes a bandwidth optimizing script or computer software application that carries out the operations of at least method 100. In an embodiment, the computer system is a computer system 500 as shown in FIG. 5, that executes a bandwidth optimizing script or computer software application that carries out at least operations 110, 120, 130, 140, 150, 160, and 170. In an embodiment, the computer system is a computer system/sever 512 as shown in FIG. 5, that executes a bandwidth optimizing script or computer software application that carries out at least operations 110, 120, 130, 140, 150, 160, and 170.

In an embodiment, the at least one CR device is a computer system 500 as shown in FIG. 5, that executes a bandwidth optimizing script or computer software application that carries out the operations of at least method 100 and that also includes a transceiver and a radio communications circuit for transmitting and receiving digital radio signals and digital communications signals on channels of digital wireless spectrum. In an embodiment, the at least one CR device is a computer system/server 512 as shown in FIG. 5, that executes a bandwidth optimizing script or computer software application that carries out the operations of at least method 100 and that also includes a transceiver and a radio communications circuit for transmitting and receiving digital radio signals and digital communications signals on channels of digital wireless spectrum. In an embodiment, the at least one CR device is a computer system 500 as shown in FIG. 5, that executes a bandwidth optimizing script or computer software application that carries out at least operations 110, 120, 130, 140, 150, 160, and 170 and that also includes a transceiver and a radio communications circuit for transmitting and receiving digital radio signals and digital communications signals on channels of digital wireless spectrum. In an embodiment, the at least one CR device is a computer system/server 512 as shown in FIG. 5, that executes a bandwidth optimizing script or computer software application that carries out at least operations 110, 120, 130, 140, 150, 160, and 170 and that also includes a transceiver and a radio communications circuit for transmitting and receiving digital radio signals and digital communications signals on channels of digital wireless spectrum.

Figure 1C:
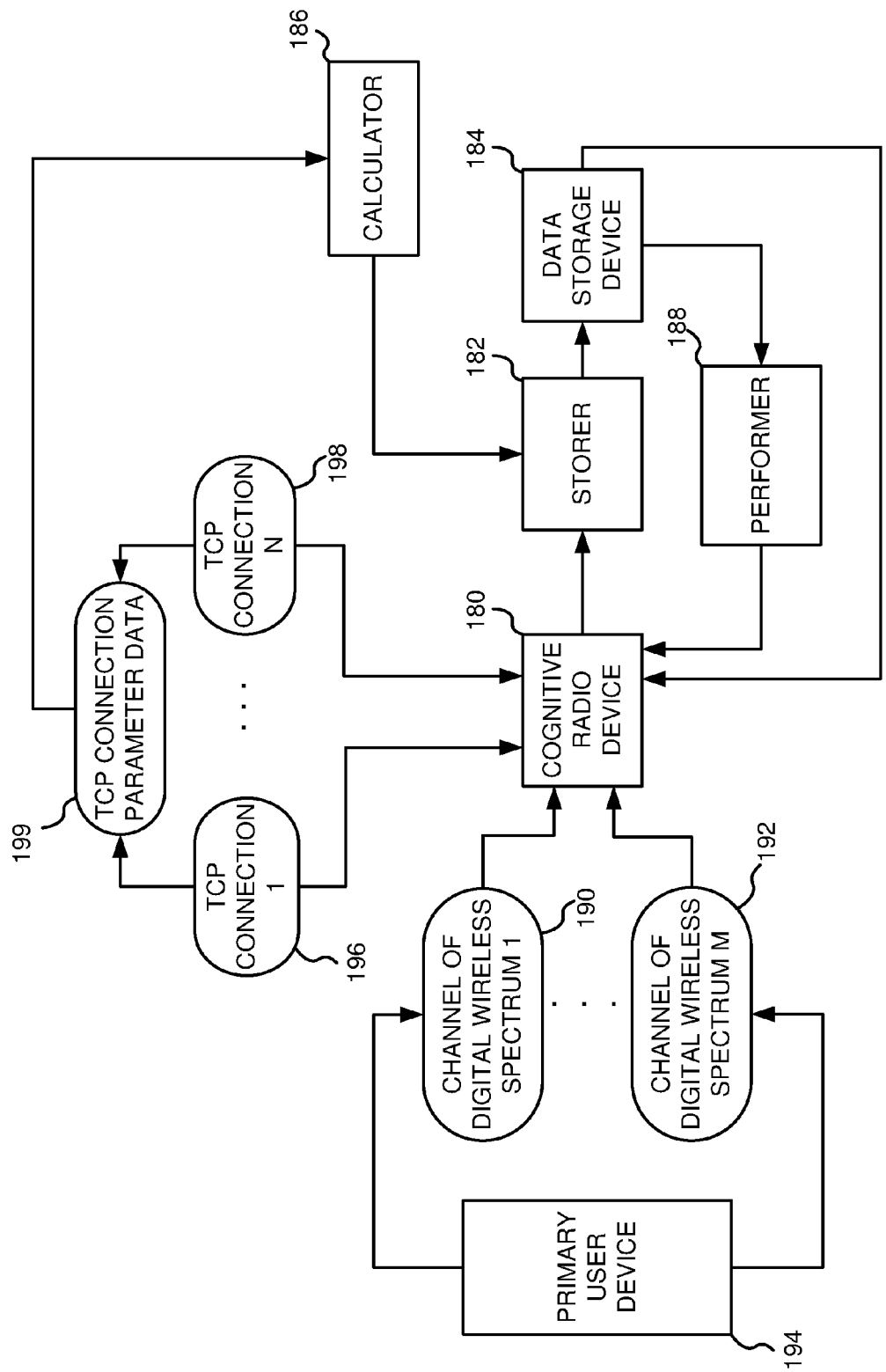
FIG. 1C depicts a block diagram in accordance with an exemplary embodiment of the present invention.

Referring to FIG. 1C, in an exemplary embodiment, the present invention includes at least one cognitive radio (CR) device 180, a storer 182, a data storage device 184, a calculator 186, and a performer 188. In an embodiment, data storage device 184 includes at least one local data storage device of CR device 180. In an embodiment, CR device 180 includes storer 182, data storage device 184, calculator 186, and performer 188.

In an embodiment, CR device 180 is configured to monitor use of a plurality of channels of digital wireless spectrum 190, 192 by at least one primary user communications device (PU device) 194 that is licensed to use at least one of the plurality of channels of digital wireless spectrum 190, 192, resulting in PU activity data describing the use. In an embodiment, CR device 180 includes a computer system, such as computer system 500 as shown in FIG. 5, performing operation 110 and includes a transceiver and a radio communications circuit for transmitting and receiving digital radio signals and digital communications signals on channels of digital wireless spectrum. In an embodiment, CR device 180 includes a computer system, such as computer system/server 512 as shown in FIG. 5, performing operation 110 and includes a transceiver and a radio communications circuit for transmitting and receiving digital radio signals and digital communications signals on channels of digital wireless spectrum. In an embodiment, CR device 180 is implemented as computer software executing on a computer system, such as computer system 500 as shown in FIG. 5, such that the computer system performs operation 110. In an embodiment, CR device 180 is implemented as computer software executing on a computer system, such as computer system/server 512 as shown in FIG. 5, such that the computer system performs operation 110. In an embodiment, CR device 180 performs operation 110 as computer software executing on a processor of CR device 180. In an embodiment, CR device 180 is configured to monitor, via at least a transceiver and a radio communications circuit of CR device 180, use of a plurality of channels of digital wireless spectrum 190, 192 by at least one primary user communications device (PU device) 194 that is licensed to use at least one of the plurality of channels of digital wireless spectrum 190, 192, resulting in PU activity data describing the use.

In an embodiment, storer 182 is configured to store the PU activity data in data storage device 184. In an embodiment, storer 182 includes a computer system, such as computer system 500 as shown in FIG. 5, performing operation 120. In an embodiment, storer 182 includes a computer system, such as computer system/server 512 as shown in FIG. 5, performing operation 120. In an embodiment, storer 182 is implemented as computer software executing on a computer system, such as computer system 500 as shown in FIG. 5, such that the computer system performs operation 120. In an embodiment, storer 182 is implemented as computer software executing on a computer system, such as computer system/server 512 as shown in FIG. 5, such that the computer system performs operation 120. In an embodiment, storer 182 is implemented as computer software executing on CR device 180, such that CR device 180 performs operation 120. In an embodiment, CR device 180 performs operation 120 as computer software executing on a processor of CR device 180.

In an embodiment, CR device 180 is configured to use a digital wireless spectrum channel, among the plurality of channels of digital wireless spectrum 190, 192, with a lowest usage by PU device 194 as indicated by the stored PU activity data. In an embodiment, CR device 180 includes a computer system, such as computer system 500 as shown in FIG. 5, performing operation 130 and includes a transceiver and a radio communications circuit for transmitting and receiving digital radio signals and digital communications signals on channels of digital wireless spectrum. In an embodiment, CR device 180 includes a computer system, such as computer system/server 512 as shown in FIG. 5, performing operation 130 and includes a transceiver and a radio communications circuit for transmitting and receiving digital radio signals and digital communications signals on channels of digital wireless spectrum. In an embodiment, CR device 180 is implemented as computer software executing on a computer system, such as computer system 500 as shown in FIG. 5, such that the computer system performs operation 130. In an embodiment, CR device 180 is implemented as computer software executing on a computer system, such as computer system/server 512 as shown in FIG. 5, such that the computer system performs operation 130. In an embodiment, CR device 180 performs operation 130 as computer software executing on a processor of CR device 180. In an embodiment, CR device 180 is configured to use, via at least a transceiver and a radio communications circuit of CR device 180, a digital wireless spectrum channel, among the plurality of channels of digital wireless spectrum 190, 192, with a lowest usage by PU device 194 as indicated by the stored PU activity data.

In an embodiment, CR device 180 is configured to detect when PU device 194 begins to use at least one digital wireless spectrum channel, among the plurality of channels of digital wireless spectrum 190, 192 corresponding to a plurality of transmission control protocol (TCP) connections 196, 198 for CR device 180. In an embodiment, CR device 180 includes a computer system, such as computer system 500 as shown in FIG. 5, performing operation 140 and includes a transceiver and a radio communications circuit for transmitting and receiving digital radio signals and digital communications signals on channels of digital wireless spectrum. In an embodiment, CR device 180 includes a computer system, such as computer system/server 512 as shown in FIG. 5, performing operation 140 and includes a transceiver and a radio communications circuit for transmitting and receiving digital radio signals and digital communications signals on channels of digital wireless spectrum. In an embodiment, CR device 180 is implemented as computer software executing on a computer system, such as computer system 500 as shown in FIG. 5, such that the computer system performs operation 140. In an embodiment, CR device 180 is implemented as computer software executing on a computer system, such as computer system/server 512 as shown in FIG. 5, such that the computer system performs operation 140. In an embodiment, CR device 180 performs operation 140 as computer software executing on a processor of CR device 180. In an embodiment, CR device 180 is configured to detect, via at least a transceiver and a radio communications circuit of CR device 180, when PU device 194 begins to use at least one digital wireless spectrum channel, among the plurality of channels of digital wireless spectrum 190, 192 corresponding to a plurality of transmission control protocol (TCP) connections 196, 198 for CR device 180.

In an embodiment, calculator 186 is configured to execute, in response to detecting operation 140, a set of logical operations calculating TCP connection data describing the plurality of TCP connections 196, 198 in light of TCP connection parameter data 199 describing connection parameters of the plurality of TCP connections 196, 198. In an embodiment, calculator 186 includes a computer system, such as computer system 500 as shown in FIG. 5, performing operation 150. In an embodiment, calculator 186 includes a computer system, such as computer system/server 512 as shown in FIG. 5, performing operation 150. In an embodiment, calculator 186 is implemented as computer software executing on a computer system, such as computer system 500 as shown in FIG. 5, such that the computer system performs operation 150. In an embodiment, calculator 186 is implemented as computer software executing on a computer system, such as computer system/server 512 as shown in FIG. 5, such that the computer system performs operation 150. In an embodiment, calculator 186 is implemented as computer software executing on CR device 180, such that CR device 180 performs operation 150. In an embodiment, CR device 180 performs operation 150 as computer software executing on a processor of CR device 180.

In an embodiment, storer 182 is configured to store the calculated TCP connection data in data storage device 184. In an embodiment, storer 182 includes a computer system, such as computer system 500 as shown in FIG. 5, performing operation 160. In an embodiment, storer 182 includes a computer system, such as computer system/server 512 as shown in FIG. 5, performing operation 160. In an embodiment, storer 182 is implemented as computer software executing on a computer system, such as computer system 500 as shown in FIG. 5, such that the computer system performs operation 160. In an embodiment, storer 182 is implemented as computer software executing on a computer system, such as computer system/server 512 as shown in FIG. 5, such that the computer system performs operation 160. In an embodiment, storer 182 is implemented as computer software executing on CR device 180, such that CR device 180 performs operation 160. In an embodiment, CR device 180 performs operation 160 as computer software executing on a processor of CR device 180.

In an embodiment, performer 188 is configured to execute a set of logical operations performing a network congestion-avoidance algorithm using the calculated TCP connection data, resulting in data describing digital wireless transmission characteristics for at least one of the plurality of TCP connections 196, 198, where the digital wireless transmission characteristics are optimized for CR device 180. In an embodiment, performer 188 includes a computer system, such as computer system 500 as shown in FIG. 5, performing operation 170. In an embodiment, performer 188 includes a computer system, such as computer system/server 512 as shown in FIG. 5, performing operation 170. In an embodiment, performer 188 is implemented as computer software executing on a computer system, such as computer system 500 as shown in FIG. 5, such that the computer system performs operation 170. In an embodiment, performer 188 is implemented as computer software executing on a computer system, such as computer system/server 512 as shown in FIG. 5, such that the computer system performs operation 170. In an embodiment, performer 188 is implemented as computer software executing on CR device 180, such that CR device 180 performs operation 170. In an embodiment, CR device 180 performs operation 170 as computer software executing on a processor of CR device 180.

In a further embodiment, CR device 180 is further configured to use the at least one of the plurality of TCP connections 196, 198, where the digital wireless transmission characteristics are optimized for CR device 180. In an embodiment, CR device 180 includes a computer system, such as computer system 500 as shown in FIG. 5, performing operation 175 and includes a transceiver and a radio communications circuit for transmitting and receiving digital radio signals and digital communications signals on channels of digital wireless spectrum. In an embodiment, CR device 180 includes a computer system, such as computer system/server 512 as shown in FIG. 5, performing operation 175 and includes a transceiver and a radio communications circuit for transmitting and receiving digital radio signals and digital communications signals on channels of digital wireless spectrum. In an embodiment, CR device 180 is implemented as computer software executing on a computer system, such as computer system 500 as shown in FIG. 5, such that the computer system performs operation 175. In an embodiment, CR device 180 is implemented as computer software executing on a computer system, such as computer system/server 512 as shown in FIG. 5, such that the computer system performs operation 175. In an embodiment, CR device 180 performs operation 175 as computer software executing on a processor of CR device 180. In a further embodiment, CR device 180 is further configured to use, via at least a transceiver and a radio communications circuit of CR device 180, the at least one of the plurality of TCP connections 196, 198, where the digital wireless transmission characteristics are optimized for CR device 180.

Monitoring Use

In an exemplary embodiment, the monitoring includes monitoring, by the at least one CR device, at least one digital communications signal from a transmitter device of the at least one PU device on the plurality of channels of digital wireless spectrum. In an embodiment, monitoring operation 110 includes monitoring, by the at least one CR device, at least one digital communications signal from a transmitter device of the at least one PU device on the plurality of channels of digital wireless spectrum. In an embodiment, CR device 180 is configured to monitor at least one digital communications signal from a transmitter device of PU device 194 on the plurality of channels of digital wireless spectrum 190, 192. In an embodiment, CR device 180 includes a computer system, such as computer system 500 as shown in FIG. 5, and includes a transceiver and a radio communications circuit for transmitting and receiving digital radio signals and digital communications signals on channels of digital wireless spectrum, monitoring at least one digital communications signal from a transmitter device of PU device 194 on the plurality of channels of digital wireless spectrum 190, 192. In an embodiment, CR device 180 includes a computer system, such as computer system/server 512 as shown in FIG. 5, and includes a transceiver and a radio communications circuit for transmitting and receiving digital radio signals and digital communications signals on channels of digital wireless spectrum, monitoring at least one digital communications signal from a transmitter device of PU device 194 on the plurality of channels of digital wireless spectrum 190, 192. In an embodiment, CR device 180 is implemented as computer software executing on a computer system, such as computer system 500 as shown in FIG. 5, such that the computer system monitors at least one digital communications signal from a transmitter device of PU device 194 on the plurality of channels of digital wireless spectrum 190, 192. In an embodiment, CR device 180 is implemented as computer software executing on a computer system, such as computer system/server 512 as shown in FIG. 5, such that the computer system monitors at least one digital communications signal from a transmitter device of PU device 194 on the plurality of channels of digital wireless spectrum 190, 192. In an embodiment, CR device 180 monitors at least one digital communications signal from a transmitter device of PU device 194 on the plurality of channels of digital wireless spectrum 190, 192 as computer software executing on a processor of CR device 180. In an embodiment, CR device 180 is configured to monitor, via at least a transceiver and a radio communications circuit of CR device 180, at least one digital communications signal from a transmitter device of PU device 194 on the plurality of channels of digital wireless spectrum 190, 192.

In a specific embodiment, the monitoring the at least one digital communications signal includes performing, by the at least one CR device, at least one of matched filter detection, energy detection, and cyclostationary-feature detection on the plurality of channels of digital wireless spectrum. In an embodiment, CR device 180 is configured to monitor the at least one digital communications signal by performing at least one of matched filter detection, energy detection, and cyclostationary-feature detection on the plurality of channels of digital wireless spectrum 190, 192. In an embodiment, CR device 180 includes a computer system, such as computer system 500 as shown in FIG. 5, and includes a transceiver and a radio communications circuit for transmitting and receiving digital radio signals and digital communications signals on channels of digital wireless spectrum, monitoring the at least one digital communications signal includes by performing at least one of matched filter detection, energy detection, and cyclostationary-feature detection on the plurality of channels of digital wireless spectrum 190, 192. In an embodiment, CR device 180 includes a computer system, such as computer system/server 512 as shown in FIG. 5 and includes a transceiver and a radio communications circuit for transmitting and receiving digital radio signals and digital communications signals on channels of digital wireless spectrum, monitoring the at least one digital communications signal includes by performing at least one of matched filter detection, energy detection, and cyclostationary-feature detection on the plurality of channels of digital wireless spectrum 190, 192. In an embodiment, CR device 180 is implemented as computer software executing on a computer system, such as computer system 500 as shown in FIG. 5, such that the computer system monitors the at least one digital communications signal includes by performing at least one of matched filter detection, energy detection, and cyclostationary-feature detection on the plurality of channels of digital wireless spectrum 190, 192. In an embodiment, CR device 180 is implemented as computer software executing on a computer system, such as computer system/server 512 as shown in FIG. 5, such that the computer system monitors the at least one digital communications signal includes by performing at least one of matched filter detection, energy detection, and cyclostationary-feature detection on the plurality of channels of digital wireless spectrum 190, 192. In an embodiment, CR device 180 monitors the at least one digital communications signal includes by performing at least one of matched filter detection, energy detection, and cyclostationary-feature detection on the plurality of channels of digital wireless spectrum 190, 192 as computer software executing on a processor of CR device 180. In an embodiment, CR device 180 is configured to monitor, via at least a transceiver and a radio communications circuit of CR device 180, the at least one digital communications signal by performing at least one of matched filter detection, energy detection, and cyclostationary-feature detection on the plurality of channels of digital wireless spectrum 190, 192.

Storing PU Activity Data

In an exemplary embodiment, storing operation 120 includes maintaining a database of PU activity on the used spectrum bands. In an embodiment, storer 182 is configured to maintain the database of PU activity on the used spectrum bands in data storage device 184. During the sensing mode, the at least one CR device can use the stored PU activity data to avoid bands that have high PU activity. The present invention thereby could reduce overhead involved in the at least one CR device changing the spectrum used and the transport protocol level triggers.

Detecting

In an exemplary embodiment, the detecting when the at least one CR device begins to use at least on digital wireless spectrum channel, among the plurality of channels of digital wireless spectrum corresponding to a plurality of TCP connections for the at least one CR device includes detecting, by the at least one CR device, at least one digital communications signal from a transmitter device of the at least one PU device on the at least one digital wireless spectrum channel. In an embodiment, detecting operation 140 includes detecting, by the at least one CR device, at least one digital communications signal from a transmitter device of the at least one PU device on the at least one digital wireless spectrum channel. In an embodiment, CR device 180 is configured to detect at least one digital communications signal from a transmitter device of PU device 194 on the at least one digital wireless spectrum channel. In an embodiment, CR device 180 includes a computer system, such as computer system 500 as shown in FIG. 5, and includes a transceiver and a radio communications circuit for transmitting and receiving digital radio signals and digital communications signals on channels of digital wireless spectrum, detecting at least one digital communications signal from a transmitter device of PU device 194 on the at least one digital wireless spectrum channel. In an embodiment, CR device 180 includes a computer system, such as computer system/server 512 as shown in FIG. 5 and includes a transceiver and a radio communications circuit for transmitting and receiving digital radio signals and digital communications signals on channels of digital wireless spectrum, detecting at least one digital communications signal from a transmitter device of PU device 194 on the at least one digital wireless spectrum channel. In an embodiment, CR device 180 is implemented as computer software executing on a computer system, such as computer system 500 as shown in FIG. 5, such that the computer system detects at least one digital communications signal from a transmitter device of PU device 194 on the at least one digital wireless spectrum channel. In an embodiment, CR device 180 is implemented as computer software executing on a computer system, such as computer system/server 512 as shown in FIG. 5, such that the computer system detects at least one digital communications signal from a transmitter device of PU device 194 on the at least one digital wireless spectrum channel. In an embodiment, CR device 180 detects at least one digital communications signal from a transmitter device of PU device 194 on the at least one digital wireless spectrum channel as computer software executing on a processor of CR device 180. In an embodiment, CR device 180 is configured to detect, via at least a transceiver and a radio communications circuit of CR device 180, at least one digital communications signal from a transmitter device of PU device 194 on the at least one digital wireless spectrum channel.

In a specific embodiment, the detecting the at least one digital communications signal includes performing, by the at least one CR device, at least one of matched filter detection, energy detection, and cyclostationary-feature detection on the at least one digital wireless spectrum channel. In an embodiment, CR device 180 is configured to detect the at least one digital communications signal by performing at least one of matched filter detection, energy detection, and cyclostationary-feature detection on the at least one digital wireless spectrum channel. In an embodiment, CR device 180 includes a computer system, such as computer system 500 as shown in FIG. 5, and includes a transceiver and a radio communications circuit for transmitting and receiving digital radio signals and digital communications signals on channels of digital wireless spectrum, detecting the at least one digital communications signal by performing at least one of matched filter detection, energy detection, and cyclostationary-feature detection on the at least one digital wireless spectrum channel. In an embodiment, CR device 180 includes a computer system, such as computer system/server 512 as shown in FIG. 5 and includes a transceiver and a radio communications circuit for transmitting and receiving digital radio signals and digital communications signals on channels of digital wireless spectrum, detecting the at least one digital communications signal by performing at least one of matched filter detection, energy detection, and cyclostationary-feature detection on the at least one digital wireless spectrum channel. In an embodiment, CR device 180 is implemented as computer software executing on a computer system, such as computer system 500 as shown in FIG. 5, such that the computer system detects the at least one digital communications signal by performing at least one of matched filter detection, energy detection, and cyclostationary-feature detection on the at least one digital wireless spectrum channel. In an embodiment, CR device 180 is implemented as computer software executing on a computer system, such as computer system/server 512 as shown in FIG. 5, such that the computer system detects the at least one digital communications signal by performing at least one of matched filter detection, energy detection, and cyclostationary-feature detection on the at least one digital wireless spectrum channel. In an embodiment, CR device 180 detects the at least one digital communications signal by performing at least one of matched filter detection, energy detection, and cyclostationary-feature detection on the at least one digital wireless spectrum channel as computer software executing on a processor of CR device 180. In an embodiment, CR device 180 is configured to detect, via at least a transceiver and a radio communications circuit of CR device 180, the at least one digital communications signal by performing at least one of matched filter detection, energy detection, and cyclostationary-feature detection on the at least one digital wireless spectrum channel.

In a further embodiment, the detecting the at least one digital communications signal further includes detecting, by the at least one CR device, at least one transition of an operating mode of the at least one CR device from a sensing mode to a transmission mode. In an embodiment, CR device 180 is further configured to detect the at least one digital communications signal by detecting at least one transition of an operating mode of CR device 180 from a sensing mode to a transmission mode. In an embodiment, CR device 180 includes a computer system, such as computer system 500 as shown in FIG. 5, and includes a transceiver and a radio communications circuit for transmitting and receiving digital radio signals and digital communications signals on channels of digital wireless spectrum, detecting the at least one digital communications signal by detecting at least one transition of an operating mode of CR device 180 from a sensing mode to a transmission mode. In an embodiment, CR device 180 includes a computer system, such as computer system/server 512 as shown in FIG. 5 and includes a transceiver and a radio communications circuit for transmitting and receiving digital radio signals and digital communications signals on channels of digital wireless spectrum, detecting the at least one digital communications signal by detecting at least one transition of an operating mode of CR device 180 from a sensing mode to a transmission mode. In an embodiment, CR device 180 is implemented as computer software executing on a computer system, such as computer system 500 as shown in FIG. 5, such that the computer system detects the at least one digital communications signal by detecting at least one transition of an operating mode of CR device 180 from a sensing mode to a transmission mode.

In an embodiment, CR device 180 is implemented as computer software executing on a computer system, such as computer system/server 512 as shown in FIG. 5, such that the computer system detects the at least one digital communications signal by detecting at least one transition of an operating mode of CR device 180 from a sensing mode to a transmission mode. In an embodiment, CR device 180 detects the at least one digital communications signal by detecting at least one transition of an operating mode of CR device 180 from a sensing mode to a transmission mode as computer software executing on a processor of CR device 180. In an embodiment, CR device 180 is further configured to detect, via at least a transceiver and a radio communications circuit of CR device 180, the at least one digital communications signal by detecting at least one transition of an operating mode of CR device 180 from a sensing mode to a transmission mode.

In a specific embodiment, the detecting the at least one transition includes scanning, by the at least one CR device, media access control (MAC) inputs of the at least one CR device for data indicating the at least one transition of the operating mode of the at least one CR device from the sensing mode to the transmission mode. In an embodiment, CR device 180 is configured to detect the at least one transition by scanning media access control (MAC) inputs of CR device 180 for data indicating the at least one transition of the operating mode of CR device 180 from the sensing mode to the transmission mode. In an embodiment, CR device 180 includes a computer system, such as computer system 500 as shown in FIG. 5, and includes a transceiver and a radio communications circuit for transmitting and receiving digital radio signals and digital communications signals on channels of digital wireless spectrum, detecting the at least one transition by scanning media access control (MAC) inputs of CR device 180 for data indicating the at least one transition of the operating mode of CR device 180 from the sensing mode to the transmission mode. In an embodiment, CR device 180 includes a computer system, such as computer system/server 512 as shown in FIG. 5, and includes a transceiver and a radio communications circuit for transmitting and receiving digital radio signals and digital communications signals on channels of digital wireless spectrum, detecting the at least one transition by scanning media access control (MAC) inputs of CR device 180 for data indicating the at least one transition of the operating mode of CR device 180 from the sensing mode to the transmission mode. In an embodiment, CR device 180 is implemented as computer software executing on a computer system, such as computer system 500 as shown in FIG. 5, such that the computer system detects the at least one transition by scanning media access control (MAC) inputs of CR device 180 for data indicating the at least one transition of the operating mode of CR device 180 from the sensing mode to the transmission mode. In an embodiment, CR device 180 is implemented as computer software executing on a computer system, such as computer system/server 512 as shown in FIG. 5, such that the computer system detects the at least one transition by scanning media access control (MAC) inputs of CR device 180 for data indicating the at least one transition of the operating mode of CR device 180 from the sensing mode to the transmission mode. In an embodiment, CR device 180 detects the at least one transition by scanning media access control (MAC) inputs of CR device 180 for data indicating the at least one transition of the operating mode of CR device 180 from the sensing mode to the transmission mode as computer software executing on a processor of CR device 180. In an embodiment, CR device 180 is configured to detect, via at least a transceiver and a radio communications circuit of CR device 180, the at least one transition by scanning media access control (MAC) inputs of CR device 180 for data indicating the at least one transition of the operating mode of CR device 180 from the sensing mode to the transmission mode.

Figure 2:
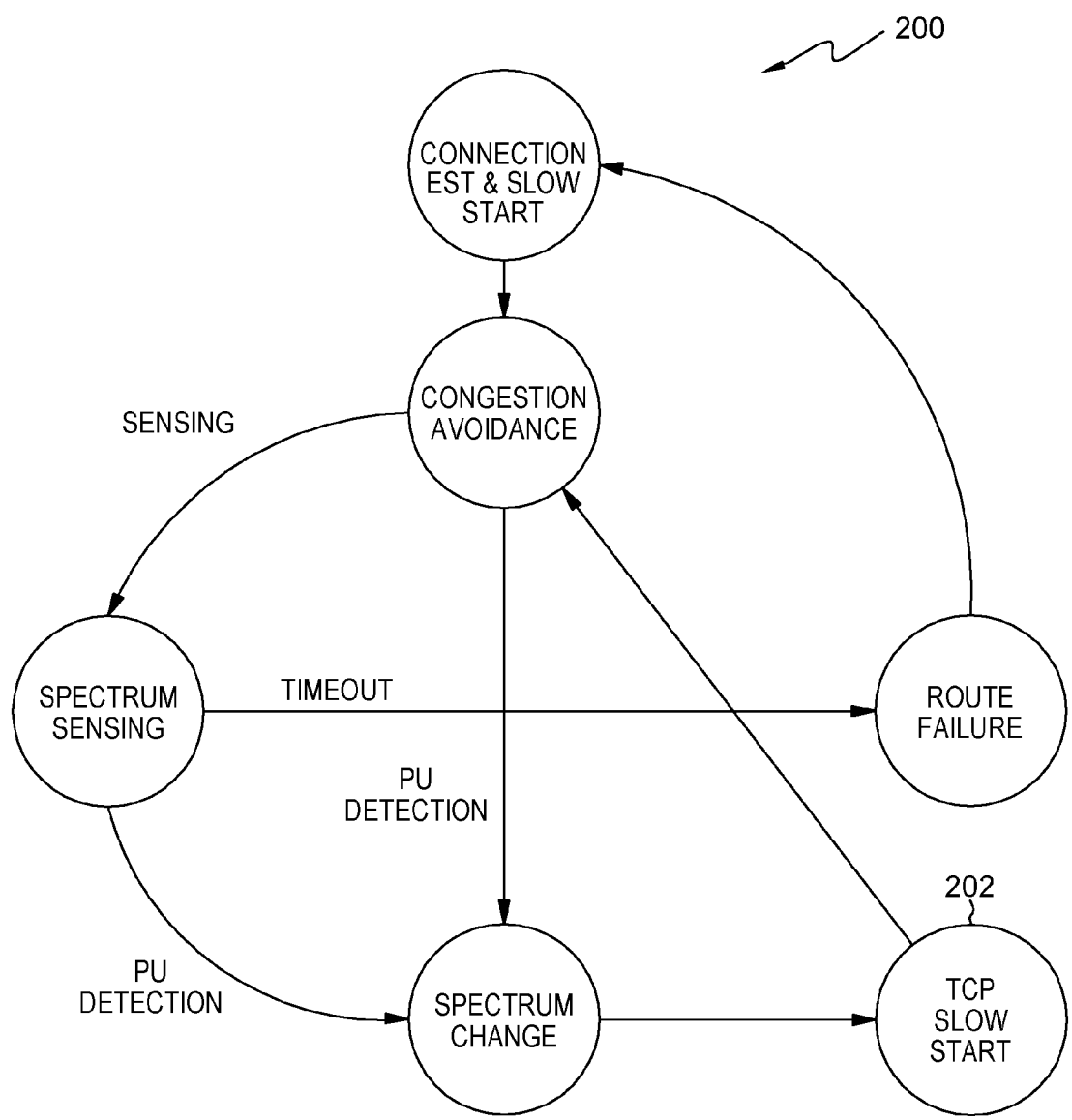
FIG. 2 depicts a state diagram in accordance with an exemplary embodiment of the present invention.

Referring to FIG. 2, in an embodiment, CR device 180 performs operation 140 during a TCP slow start phase 202. In an embodiment, CR device 180 performs operation 150 during TCP slow start phase 202. In an embodiment, CR device 180 performs operation 160 during TCP slow start phase 202. In an embodiment, CR device 180 performs operation 170 during TCP slow start phase 202.

Calculating TCP Connection Data

In an exemplary embodiment, the connection parameters of the plurality of TCP connections include at least one of a round trip time and an average congestion window. In an embodiment, the connection parameters of plurality of TCP connections 196, 198 include at least one of a round trip time and an average congestion window. Parameters like estimated round trip time (RTT) and average congestion window are learned for the TCP connections, and are used as seed values for RTT estimators and initial congestion window values in at least a network congestion avoidance algorithm. RTT and average congestion window data is collected on a source-destination basis using an exponentially weighted running average model, thereby improving the bandwidth for future connection between learned hosts.

In an exemplary embodiment, the calculating includes calculating, by the computer system, the TCP connection data via an exponential moving average formula using as inputs the TCP connection parameter data. In an embodiment, the calculating of operation 150 includes calculating, by the computer system, the TCP connection data via an exponential moving average formula using as inputs the TCP connection parameter data. In an embodiment, calculator 186 is configured to execute, in response to detecting operation 140, a set of logical operations calculating the TCP connection data via an exponential moving average formula using as inputs TCP connection parameter data 199. In an embodiment, calculator 186 includes a computer system, such as computer system 500 as shown in FIG. 5, executing, in response to detecting operation 140, a set of logical operations calculating the TCP connection data via an exponential moving average formula using as inputs TCP connection parameter data 199. In an embodiment, calculator 186 includes a computer system, such as computer system/server 512 as shown in FIG. 5, executing, in response to detecting operation 140, a set of logical operations calculating the TCP connection data via an exponential moving average formula using as inputs TCP connection parameter data 199. In an embodiment, calculator 186 is implemented as computer software executing on a computer system, such as computer system 500 as shown in FIG. 5, such that the computer system executes, in response to detecting operation 140, a set of logical operations calculating the TCP connection data via an exponential moving average formula using as inputs TCP connection parameter data 199. In an embodiment, calculator 186 is implemented as computer software executing on a computer system, such as computer system/server 512 as shown in FIG. 5, such that the computer system executes, in response to detecting operation 140, a set of logical operations calculating the TCP connection data via an exponential moving average formula using as inputs TCP connection parameter data 199. In an embodiment, calculator 186 is implemented as computer software executing on CR device 180, such that CR device 180 executes, in response to detecting operation 140, a set of logical operations calculating the TCP connection data via an exponential moving average formula using as inputs TCP connection parameter data 199. In an embodiment, CR device 180 executes, in response to detecting operation 140, a set of logical operations calculating the TCP connection data via an exponential moving average formula using as inputs TCP connection parameter data 199 as computer software executing on a processor of CR device 180. In an embodiment, the exponential moving average formula is as follows:

$$EMA(t) = [\text{Current Value} * a] + [EMA(t-1) * (1-a)],$$

where a is a smoothing factor, $0 < a < 1$.

Performing Network Congestion-Avoidance Algorithm

In an exemplary embodiment, the network congestion-avoidance algorithm includes at least one variant of TCP Westwood. In a specific embodiment, the least one variant of TCP Westwood includes TCP Westwood+.

EXAMPLE

Figure 3A:
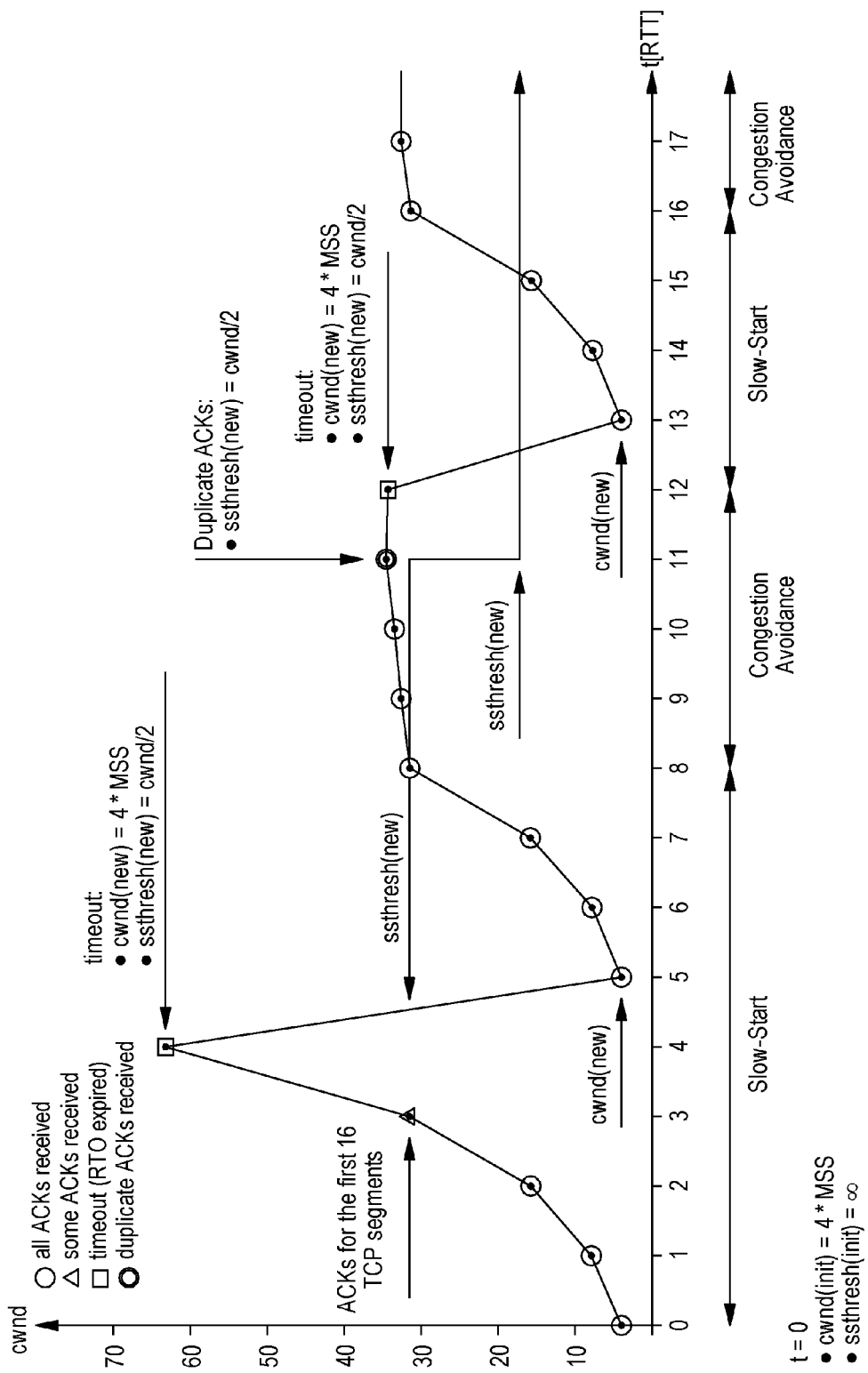
FIG. 3A depicts a graph in accordance with an exemplary embodiment of the present invention.

Referring to FIG. 3A, for example, a graph 300 of a congestion window depicts slow start and congestion avoidance phases of a network congestion avoidance algorithm as cwnd versus RTT. Parameters like estimated round trip time (RTT) and average congestion window are learned for the TCP connections, and are used as seed values for RTT estimators and initial congestion window values in at least a network congestion avoidance algorithm. RTT and average congestion window data is collected on a source-destination basis using an exponentially weighted running average model, thereby improving the bandwidth for future connection between learned hosts.

Figure 3B:
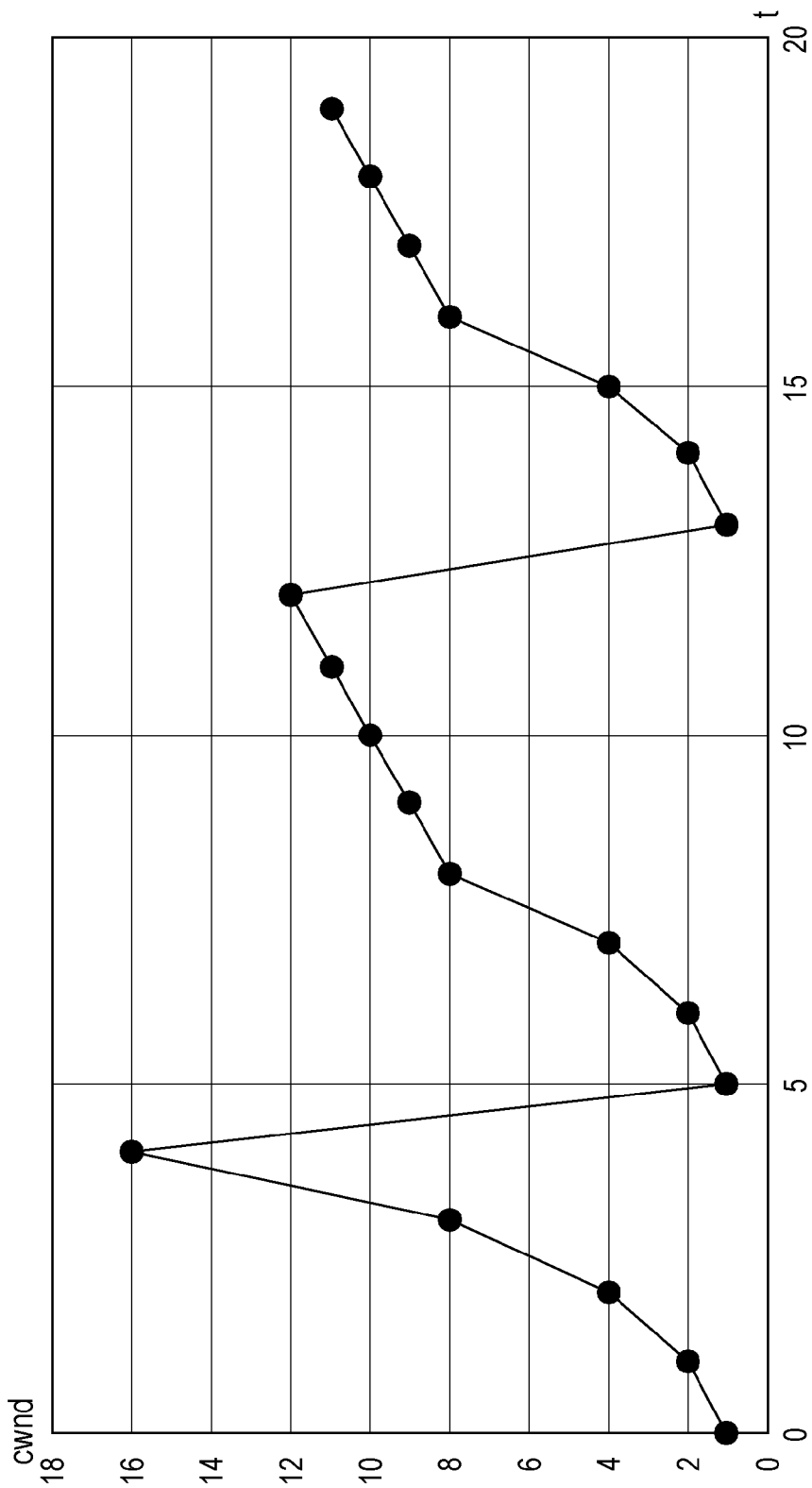
FIG. 3B depicts a graph in accordance with an exemplary embodiment of the present invention.
Figure 3C:
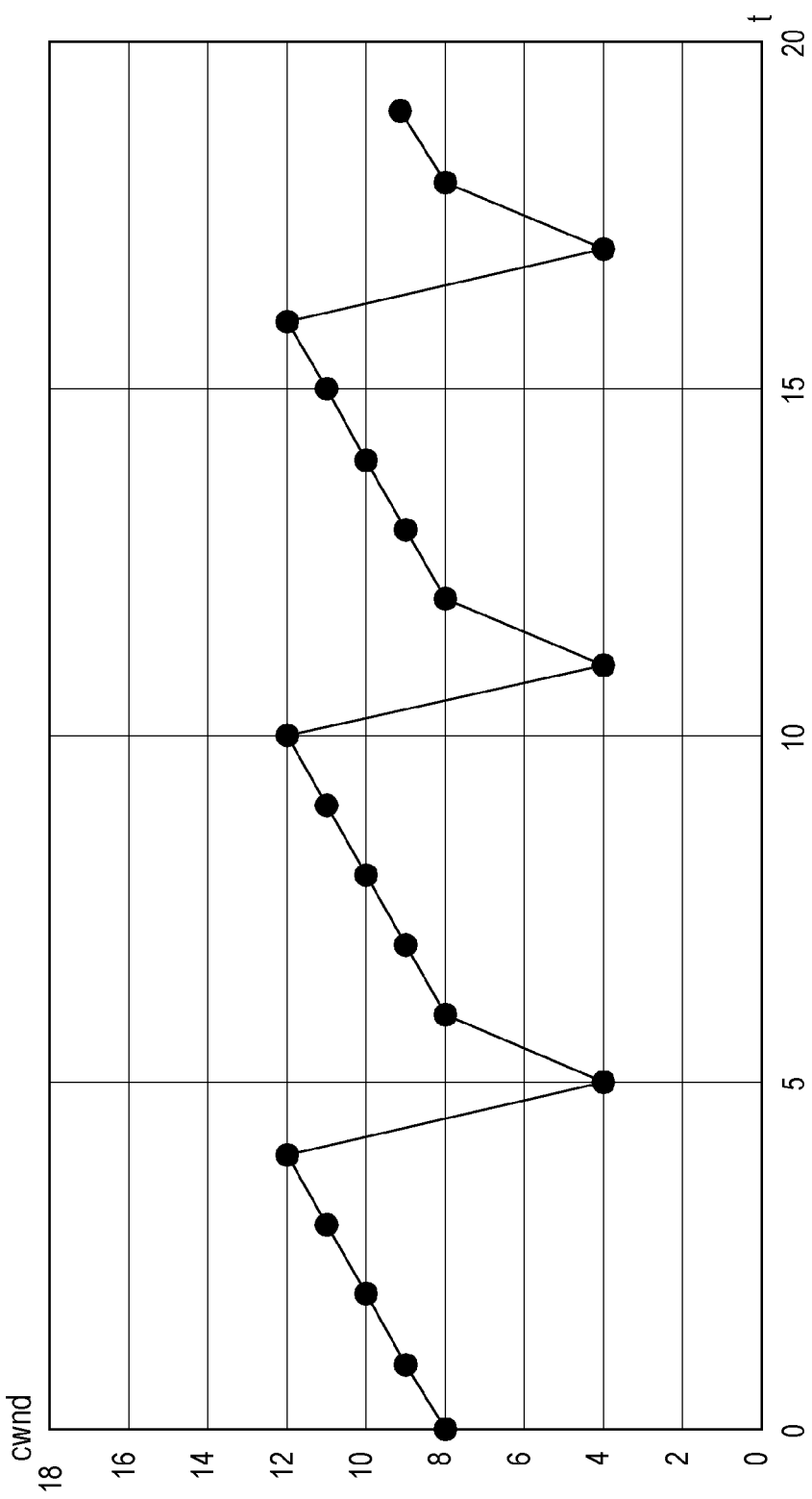
FIG. 3C depicts a graph in accordance with an exemplary embodiment of the present invention.

Referring to FIG. 3B and FIG. 3C, learning of parameters across connections between two hosts by the present invention is depicted. FIG. 3B depicts an example congestion window (cwnd) dynamics (cwnd over time) learned by the present invention, where the exponential moving average of cwnd is approximately 8, considering a=0.4, via an exponential moving average formula as follows:

$$EMA(t) = [\text{Current Value} * a] + [EMA(t-1) * (1-a)],$$

where a is a smoothing factor, $0 < a < 1$.

In the next connection, the present invention, instead of starting with 1 packet, starts with a factor of the calculated value (in this example, 8). FIG. 3C depicts the modified behavior of the CR device such that bandwidth available to the connection in improved, as indicated by indicated by the increased area under the graph in FIG. 3C.

Figure 4:
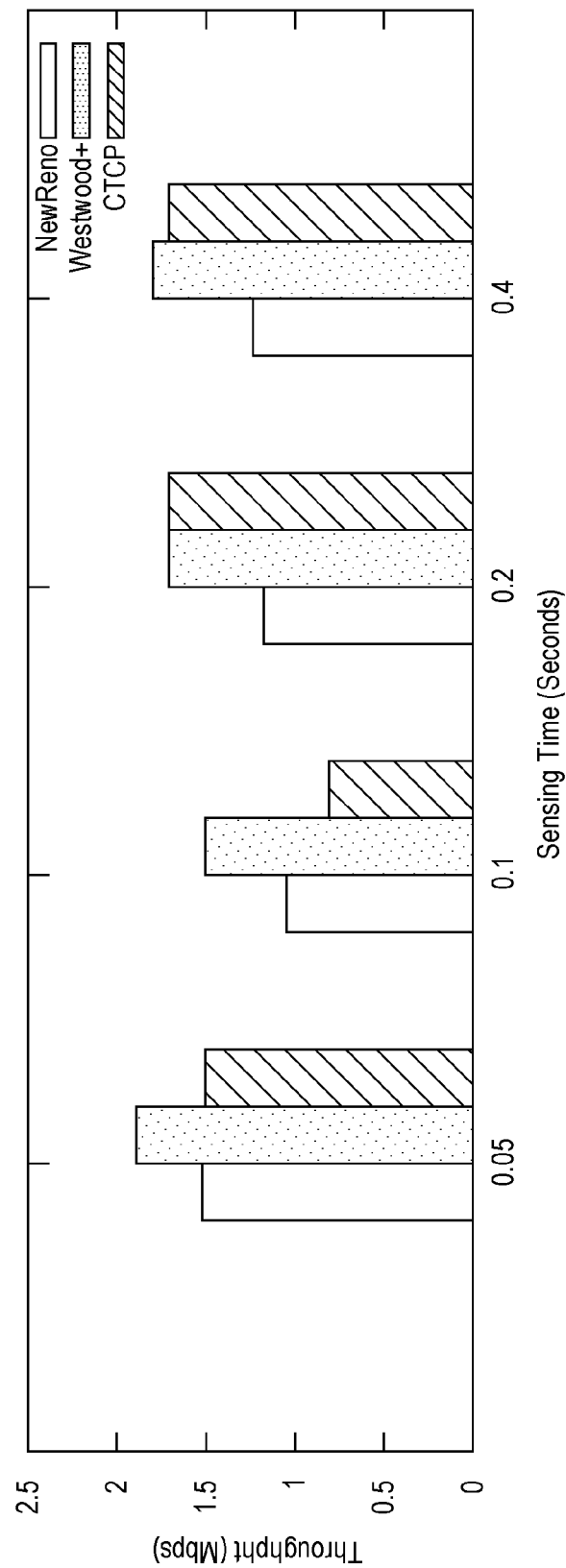
FIG. 4 depicts a graph in accordance with an exemplary embodiment of the present invention.

Referring to FIG. 4, a throughput versus sensing time graph is depicted. The graph in FIG. 4 shows that TCP Westwood+ can outperform TCP New Reno in most of cases.

Computer System

In an exemplary embodiment, the computer system is a computer system 500 as shown in FIG. 5. Computer system 500 is only one example of a computer system and is not intended to suggest any limitation as to the scope of use or functionality of embodiments of the present invention. Regardless, computer system 500 is capable of being implemented to perform and/or performing any of the functionality/operations of the present invention.

Computer system 500 includes a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 512 may be described in the general context of computer system-executable instructions, such as program modules, being executed by a computer system. Generally, program modules may include routines, programs, objects, components, logic, and/or data structures that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computer system 500 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions/operations of embodiments of the invention.

Program/utility 540, having a set (at least one) of program modules 542, may be stored in memory 528 by way of example, and not limitation. Exemplary program modules 542 may include an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the present invention.

Computer system/server 512 may also communicate with one or more external devices 514 such as a keyboard, a pointing device, a display 24, one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
   monitoring, by at least one cognitive radio (CR) device, use of a plurality of channels of digital wireless spectrum by at least one primary user communications device (PU device) that is licensed to use at least one of the plurality of channels of digital wireless spectrum, resulting in PU activity data describing the use;
   storing, by a computer system, the PU activity data in a data storage device;
   using, by the at least one CR device, a digital wireless spectrum channel, among the plurality of channels of digital wireless spectrum, with a lowest usage by the at least one PU device as indicated by the stored PU activity data;
   detecting, by the at least one CR device, when the at least one PU device begins to use at least one digital wireless spectrum channel, among the plurality of channels of digital wireless spectrum corresponding to a plurality of transmission control protocol (TCP) connections for the at least one CR device;
   executing, by the computer system, in response to the detecting, a set of logical operations calculating TCP connection data describing the plurality of TCP connections in light of TCP connection parameter data describing connection parameters of the plurality of TCP connections;
   storing, by the computer system, the calculated TCP connection data in the data storage device; and
   executing, by the computer system, a set of logical operations performing a network congestion-avoidance algorithm using the calculated TCP connection data, resulting in data describing digital wireless transmission characteristics for at least one of the plurality of TCP connections, wherein the digital wireless transmission characteristics are optimized for the at least one CR device.

2. The method of claim 1 wherein the monitoring comprises monitoring, by the at least one CR device, at least one digital communications signal from a transmitter device of the at least one PU device on the plurality of channels of digital wireless spectrum.

3. The method of claim 2 wherein the monitoring the at least one digital communications signal comprises performing, by the at least one CR device, at least one of matched filter detection, energy detection, and cyclostationary-feature detection on the plurality of channels of digital wireless spectrum.

4. The method of claim 1 wherein the detecting comprises detecting, by the at least one CR device, at least one digital communications signal from a transmitter device of the at least one PU device on the at least one digital wireless spectrum channel.

5. The method of claim 4 wherein the detecting the at least one digital communications signal comprises performing, by the at least one CR device, at least one of matched filter detection, energy detection, and cyclostationary-feature detection on the at least one digital wireless spectrum channel.

6. The method of claim 4 wherein the detecting further comprises detecting, by the at least one CR device, at least one transition of an operating mode of the at least one CR device from a sensing mode to a transmission mode.

7. The method of claim 6 wherein the detecting the at least one transition comprises scanning, by the at least one CR device, media access control (MAC) inputs of the at least one CR device for data indicating the at least one transition of the operating mode of the at least one CR device from the sensing mode to the transmission mode.

8. The method of claim 1 wherein the connection parameters of the plurality of TCP connections comprise at least one of a round trip time and an average congestion window.

9. The method of claim 1 wherein the calculating comprises calculating, by the computer system, the TCP connection data via an exponential moving average formula using as inputs the TCP connection parameter data.

10. The method of claim 1 wherein the network congestion-avoidance algorithm comprises at least one variant of TCP Westwood.

11. The method of claim 10 wherein the least one variant of TCP Westwood comprises TCP Westwood+.

12. The method of claim 1 wherein the computer system comprises the at least one CR device.

13. The method of claim 1 wherein the data storage device comprises at least one local data storage device of the at least one CR device.

14. The method of claim 1 further comprising using, by the at least one CR device, the at least one of the plurality of TCP connections, wherein the digital wireless transmission characteristics are optimized for the at least one CR device.

15. A system comprising:
   a memory; and
   a processor in communication with the memory, the processor configured to perform a method comprising monitoring use of a plurality of channels of digital wireless spectrum by at least one primary user communications device (PU device) that is licensed to use at least one of the plurality of channels of digital wireless spectrum, resulting in PU activity data describing the use, storing the PU activity data in a data storage device, using a digital wireless spectrum channel, among the plurality of channels of digital wireless spectrum, with a lowest usage by the at least one PU device as indicated by the stored PU activity data, detecting when the at least one PU device begins to use at least one digital wireless spectrum channel, among the plurality of channels of digital wireless spectrum corresponding to a plurality of transmission control protocol (TCP) connections for at least one cognitive radio (CR) device, executing, in response to the detecting, a set of logical operations calculating TCP connection data describing the plurality of TCP connections in light of TCP connection parameter data describing connection parameters of the plurality of TCP connections, storing the calculated TCP connection data in the data storage device, and executing a set of logical operations performing a network congestion-avoidance algorithm using the calculated TCP connection data, resulting in data describing digital wireless transmission characteristics for at least one of the plurality of TCP connections, wherein the digital wireless transmission characteristics are optimized for the at least one CR device.

16. The system of claim 15 wherein the detecting comprises detecting at least one digital communications signal from a transmitter device of the at least one PU device on the at least one digital wireless spectrum channel.

17. The system of claim 16 wherein the detecting the at least one digital communications signal comprises performing at least one of matched filter detection, energy detection, and cyclostationary-feature detection on the at least one digital wireless spectrum channel.

18. The system of claim 15 wherein the calculating comprises calculating the TCP connection data via an exponential moving average formula using as inputs the TCP connection parameter data.

19. A computer program product comprising a computer readable storage medium having program instructions embodied therewith, the program instructions executable by a processor to cause the processor to perform a method comprising:

monitoring use of a plurality of channels of digital wireless spectrum by at least one primary user communications device (PU device) that is licensed to use at least one of the plurality of channels of digital wireless spectrum, resulting in PU activity data describing the use, storing the PU activity data in a data storage device, using a digital wireless spectrum channel, among the plurality of channels of digital wireless spectrum, with a lowest usage by the at least one PU device as indicated by the stored PU activity data, detecting when the at least one PU device begins to use at least one digital wireless spectrum channel, among the plurality of channels of digital wireless spectrum corresponding to a plurality of transmission control protocol (TCP) connections for at least one cognitive radio (CR) device, executing, in response to the detecting, a set of logical operations calculating TCP connection data describing the plurality of TCP connections in light of TCP connection parameter data describing connection parameters of the plurality of TCP connections, storing the calculated TCP connection data in the data storage device, and executing a set of logical operations performing a network congestion-avoidance algorithm using the calculated TCP connection data, resulting in data describing digital wireless transmission characteristics for at least one of the plurality of TCP connections, wherein the digital wireless transmission characteristics are optimized for the at least one CR device.

20. The computer program product of claim 19, wherein the calculating comprises calculating the TCP connection data via an exponential moving average formula using as inputs the TCP connection parameter data.

* * * * *